US008233384B2

(12) United States Patent
Osterhout et al.

(10) Patent No.: US 8,233,384 B2
(45) Date of Patent: Jul. 31, 2012

(54) GEOGRAPHIC REDUNDANCY IN COMMUNICATION NETWORKS

(75) Inventors: Gregory Osterhout, Coppell, TX (US); R. Alberto Villarica, Dallas, TX (US)

(73) Assignee: Rockstar Bidco, LP, New York, NY (US)

( * ) Notice: Subject to any disclaimer, the term of this patent is extended or adjusted under 35 U.S.C. 154(b) by 948 days.

(21) Appl. No.: 11/313,338

(22) Filed: Dec. 21, 2005

(65) Prior Publication Data

US 2007/0140112 A1    Jun. 21, 2007

(51) Int. Cl.
*G01R 31/08* (2006.01)
(52) U.S. Cl. ............... 370/225; 370/331; 370/352
(58) Field of Classification Search .......... 370/203, 370/328, 400, 252–254, 237, 216–228, 389, 370/395.2, 352; 709/219, 220, 218, 225, 709/228, 226, 203; 714/4; 455/418, 411, 455/453, 433, 444; 713/201; 379/220.01, 379/221.01; 726/12
See application file for complete search history.

(56) References Cited

U.S. PATENT DOCUMENTS

| 5,711,002 | A  | * | 1/1998  | Foti ............................ 455/433 |
| 6,185,616 | B1 | * | 2/2001  | Namma et al. ................. 709/227 |
| 6,519,249 | B1 | * | 2/2003  | Bennefeld et al. ............ 370/352 |
| 6,567,665 | B1 | * | 5/2003  | Kissee .......................... 455/436 |
| 6,658,095 | B1 |   | 12/2003 | Yoakum et al. |
| 6,738,343 | B1 | * | 5/2004  | Shaffer et al. ................. 370/216 |
| 6,779,035 | B1 | * | 8/2004  | Gbadegesin .................. 709/228 |
| 7,228,134 | B2 | * | 6/2007  | Gandhi et al. ................. 455/434 |
| 7,366,110 | B2 | * | 4/2008  | Gillespie et al. .............. 370/254 |
| 7,397,775 | B2 | * | 7/2008  | Womack et al. ............... 370/328 |
| 7,457,270 | B2 | * | 11/2008 | Tsao ............................. 370/338 |

| 2002/0035605 | A1 |   | 3/2002 | McDowell et al. |
| 2002/0049842 | A1 | * | 4/2002 | Huetsch et al. ............... 709/225 |
| 2003/0005350 | A1 | * | 1/2003 | Koning et al. ................. 714/4 |
| 2003/0105865 | A1 | * | 6/2003 | McCanne et al. ............. 709/225 |
| 2003/0123635 | A1 | * | 7/2003 | Lee ............................. 379/220.01 |
| 2003/0126200 | A1 | * | 7/2003 | Wolff ............................ 709/203 |

(Continued)

FOREIGN PATENT DOCUMENTS

WO    2005/089055 A2    9/2005

OTHER PUBLICATIONS

Malpani et al, Making World Wide Web Caching servers cooperate, Dec. 1995.*

(Continued)

*Primary Examiner* — Andrew Chriss
*Assistant Examiner* — Vincelas Louis
(74) *Attorney, Agent, or Firm* — Withrow & Terranova, PLLC

(57) ABSTRACT

The present invention provides a redundancy mechanism for packet-based communication environments without requiring localized redundancy of session control entities. These session control entities are generally referred to as service nodes, which may act as proxies on behalf of the communication terminals being served. Instead of having a dedicated backup service node, other active service nodes, which primarily serve different groups of communication terminals, are configured to provide backup support when another service node fails. In operation, a communication terminal will periodically attempt to communicate with its primary service node. When the communication terminal detects that the attempts to communicate with the service node are unsuccessful, the communication terminal will attempt to register with a selected alternate service node, the alternate service node being a currently active service node primarily supporting another group of communication terminals. The alternate service node can then accept and support the communication terminal.

11 Claims, 4 Drawing Sheets

U.S. PATENT DOCUMENTS

| | | | |
|---|---|---|---|
| 2004/0044762 A1 | 3/2004 | Peacock | |
| 2004/0059781 A1 | 3/2004 | Yoakum et al. | |
| 2004/0120498 A1* | 6/2004 | Sylvain | 379/221.01 |
| 2004/0122901 A1 | 6/2004 | Sylvain | |
| 2004/0258019 A1* | 12/2004 | Haumont et al. | 370/331 |
| 2004/0259528 A1* | 12/2004 | Gandhi et al. | 455/411 |
| 2005/0003821 A1* | 1/2005 | Sylvain | 455/444 |
| 2005/0058061 A1* | 3/2005 | Shaffer et al. | 370/216 |
| 2005/0141499 A1* | 6/2005 | Ma et al. | 370/389 |
| 2005/0172013 A1 | 8/2005 | Tan et al. | |
| 2005/0207397 A1* | 9/2005 | Berndt et al. | 370/352 |
| 2005/0257258 A1* | 11/2005 | Kinoshita et al. | 726/12 |
| 2006/0003766 A1 | 1/2006 | Parameswar et al. | |
| 2006/0064478 A1* | 3/2006 | Sirkin | 709/223 |
| 2006/0135173 A1* | 6/2006 | Vannithamby | 455/453 |
| 2007/0008880 A1* | 1/2007 | Buchko et al. | 370/218 |
| 2007/0160058 A1* | 7/2007 | Zhou et al. | 370/395.2 |
| 2008/0137604 A1* | 6/2008 | Lee | 370/330 |

OTHER PUBLICATIONS

International Search Report for PCT/IB2006/002542 mailed Feb. 28, 2007.

International Search Report for PCT/IB2006/003744 mailed Jun. 26, 2007.

* cited by examiner

GEOGRAPHIC REDUNDANCY IN COMMUNICATION NETWORKS

FIELD OF THE INVENTION

The present invention relates to communications, and in particular to providing geographic redundancy to address underlying network failures.

BACKGROUND OF THE INVENTION

Internet Protocol (IP) based communication sessions used for voice, streaming media, or other multimedia sessions have become pervasive in today's communication networks. The IP networks supporting these sessions have evolved to match both the increasing demand and the increasing expectations for reliability. In essence, consumers are expecting packet-based communications to rival the reliability of traditional circuit-switched communications afforded by the Public Switched Telephone Network (PSTN). Efforts to increase reliability in the IP networks have led to providing massive redundancy of various network nodes that support or facilitate the communication sessions.

In Session Initiation Protocol (SIP) based networks, a SIP proxy server is used to afford a communication terminal access to the SIP network as well as to establish and control communication sessions involving the communication terminal. In an effort to increase reliability of the SIP network, each SIP proxy is replicated one or more times to afford redundancy in case one or more SIP servers fail. Providing such redundancy has proven costly, and often futile.

The most common failures in SIP networks are not related to the SIP proxies, but instead, the underlying network equipment such as the routers, switches, and gateways, where redundancy is not specifically provided. In many instances, an underlying network failure causes an outage in a portion of the SIP network; however, the SIP server and the redundant SIP servers remain functioning. In essence, the SIP proxy and the communication terminal are simply isolated from each other, but are still operational. As such, the affected SIP proxy and communication terminal may be able to communicate with other entities from which they are not isolated. These other entities may include geographically remote SIP proxies and communication terminals for which the network outage is not causing isolation.

Accordingly, there is a need for a technique to provide a reliable network without requiring the normal redundancy provided in today's networks. There is a further need to provide a network that provides reliability in light of failures occurring in the underlying network equipment, which result in localized network outages in certain geographic locations.

SUMMARY OF THE INVENTION

The present invention provides a redundancy mechanism for packet-based communication environments without requiring localized redundancy of session control entities. These session control entities are generally referred to as service nodes, which may act as proxies on behalf of the communication terminals being served. Instead of having a dedicated backup service node, other active service nodes, which primarily serve different groups of communication terminals, are configured to provide backup support when another service node fails. In operation, a communication terminal will periodically attempt to communicate with its primary service node. These attempts may be registration attempts, which are responded to with an appropriate acknowledgement. When the communication terminal detects that the attempts to communicate with the service node are unsuccessful, the communication terminal will attempt to register with a selected alternate service node, wherein the alternate service node is a currently active service node primarily supporting another group of communication terminals. The alternate service node can then accept and support the communication terminal.

The alternate service node may be too busy to accept additional communication terminals, and may simply reject the association attempt in general, or may provide specific instructions for the communication terminal to attempt to associate with another alternate service node. When a general rejection is received, the communication terminal will access a list of prioritized service nodes and select another alternate service node. When specific instructions are received, the communication terminal will be able to determine an alternate service node from the information in the instructions. In either case, the communication terminal will attempt to associate with the other alternate service node. This process may continue until an acceptable alternate service node is found.

In the meantime, the communication terminal may continue to periodically attempt to communicate with the primary service node. When an attempt is successful, the communication terminal will register with the primary service node. The primary and alternate service nodes may communicate with each other to provide updates as to which service node is currently serving the communication terminal. When being served by an alternate service node, the communication terminal will also periodically attempt to communicate with the serving alternate service node in the same manner described above to detect when communications with the currently serving service node are not possible. If communications are not possible, the process will repeat. Notably, the periodic attempts to communicate with the various service nodes may be facilitated at consistent time intervals, random time intervals, or upon any other event or timing criteria. The term "periodically" is intended to mean that communication attempts are repeated over time.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
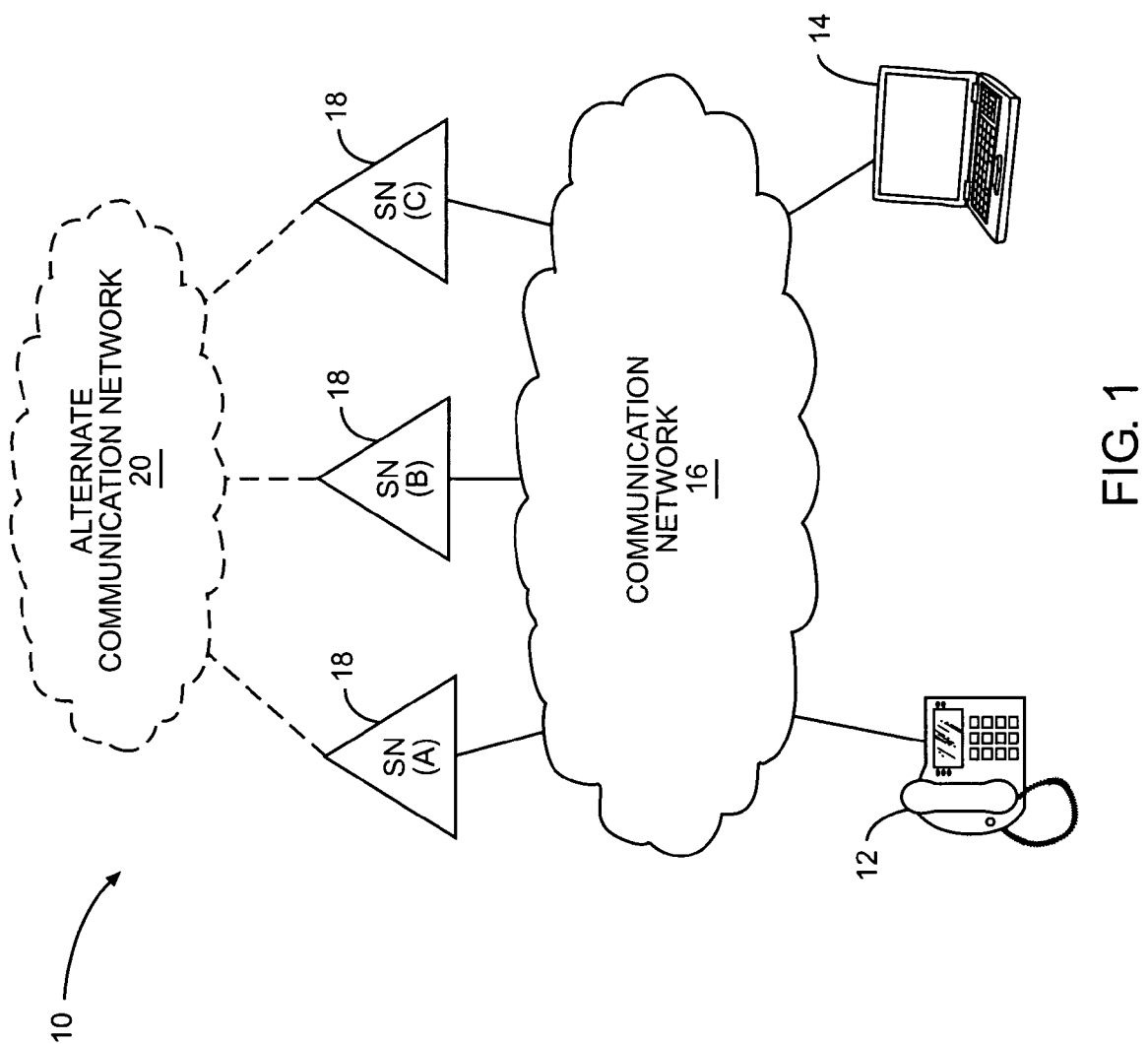
FIG. 1 is a block representation of a communication environment according to one embodiment of the present invention.

The present invention provides excellent reliability in a communication network, without requiring the traditional redundancy of communication equipment. Prior to delving into the details of the present invention, an overview of a basic communication environment 10 is described in association with FIG. 1. In general, any number of communication terminals, such as a primary communication terminal 12 and a remote communication terminal 14, are able to communicate with each other via a communication network 16. The primary communication terminal 12 and the remote communication terminal 14 may access the communication network 16 through any number of wired or wireless techniques, which are known to those skilled in the art. The communications between the primary communication terminal 12 and remote communication terminal 14 may support data or streaming media sessions, such as audio, video, and voice sessions for various applications. Although any number of communication protocols may be implemented to support communications, the description herein assumes the communication network 16 is an Internet Protocol (IP) based network and the primary communication terminal 12 and the remote communication terminal 14 use the Session Initiation Protocol (SIP) for establishment and control of communication sessions established therebetween. Those skilled in the art will recognize that any number of other communication terminals, which may include personal computers, mobile telephones, personal digital assistants, and any other communication device, may be supported. FIG. 1 only depicts the primary communication terminal 12 and the remote communication terminal 14 for the sake of conciseness and clarity.

In many packet-based communication environments, a service node (SN) 18 may be used to facilitate session control, which may include facilitating session establishment, ending a session, as well as implementing specific control functions on the session while the session is active. In a SIP environment, the primary communication terminal 12 and the remote communication terminal 14 may be associated with one or more of the service nodes 18, which will act as SIP proxies on behalf of the respective communication terminals. Assume in the illustration that the primary communication terminal 12 is associated with service node 18A, and the remote communication terminal 14 is associated with service node 18C.

Since the communication network 16 covers a large geographic area and is formed by the interconnection of numerous smaller networks, device failures or other network outages may affect various geographic regions of the communication network 16, wherein communications between the primary communication terminal 12 and the service node 18A or between the remote communication terminal 14 and the service node 18C may be impacted. The present invention provides a mechanism to allow the affected one of the primary and remote communication terminals 12, 14 to associate itself with a different service node 18 on a permanent or temporary basis, when there is a failure in a portion of the communication network 16 preventing access to the serving service node 18 or a failure in the service node 18 itself. Given the important role played by the service nodes 18, the communication network 16 may provide for more robust communications among the various service nodes 18 in light of partial failures within the communication network 16. Alternatively, an alternate communication network 20 may be provided to allow the service nodes 18 to communicate directly or indirectly with each other during normal operation or during failure within the communication network 16 preventing one or more of the service nodes 18 from being able to communication with each other.

In the illustrated embodiment, the service nodes 18 to which the primary and remote communication terminals 12, 14 are assigned do not require a local, redundant service node 18. As such, the expense of replicating each of the service nodes 18A, 18B, 18C is avoided. Instead, any of the active service nodes 18, assuming there is capacity, will be able to act as a backup for another service node 18. In one embodiment of the present invention, the primary communication terminal 12 is configured to participate in determining when support should be switched from the primary service node 18 to another service node 18. In another embodiment, the various service nodes 18 will be able to communicate with each other and determine when service for the primary communication terminal 12 should be switched from one service node 18 to another service node 18. These embodiments are illustrated in the communication flows provided in FIGS. 2 and 3, respectively.

Figure 2:
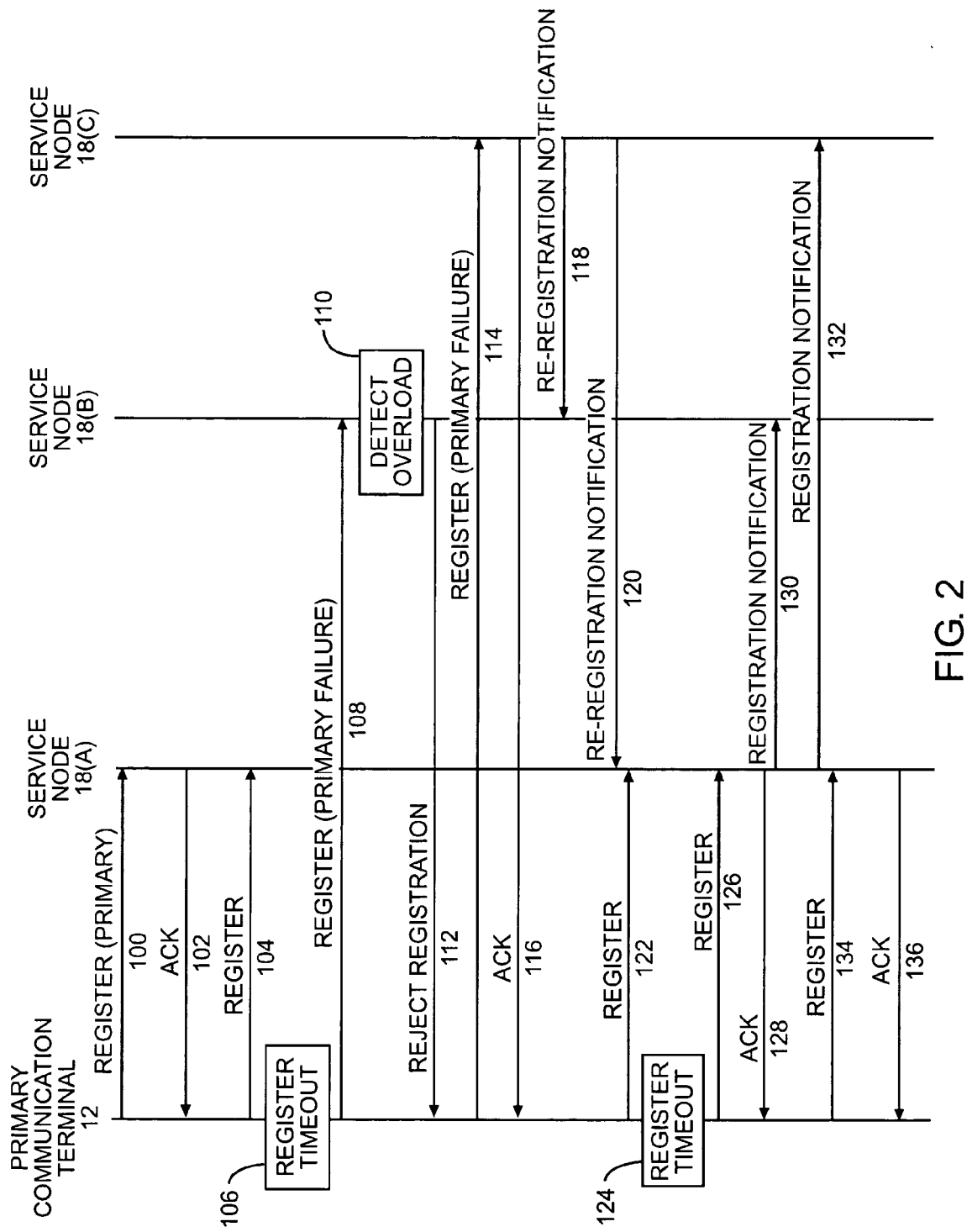
FIG. 2 is a communication flow diagram according to one embodiment of the present invention.

Turning now to FIG. 2, the primary communication terminal 12 is configured to periodically register with service node 18A. If there is a failure of service node 18A or a portion of the communication network 16 wherein registration cannot be effected, the primary communication terminal 12 is configured to register with alternate service node 18B. In this embodiment, the primary communication terminal 12 is configured to use service node 18B as an alternate service node in case of failure. Further, service node 18B is not simply a redundant service node for service node 18A. Instead, service node 18B is currently active supporting other communication terminals, and is likely geographically spaced apart from service node 18A as well as from service node 18C. In one embodiment, the service nodes 18A, 18B, and 18C are located at different locations and are used primarily to support communication terminals generally located in different geographic regions, such as Ottawa, Ontario; Raleigh, N.C.; and Richardson, Tex. Once the primary communication terminal 12 is re-registered with another service node 18B, support for communications will be provided by service node 18B. However, the primary communication terminal 12 will also try to re-register with service node 18A. When the failure is rectified and the primary communication terminal 12 can again register with service node 18A, it will register with service node 18A and resume normal operation, wherein service node 18A supports communications. A detailed communication flow is described in association with FIG. 2.

In this embodiment, the primary communication terminal 12 has the addresses of multiple service nodes 18, and in particular the addresses of service nodes 18A, 18B, and 18C. Further, there is relatively high communication ability between the service nodes 18A, 18B, and 18C. SIP messaging is used between the service nodes 18 and the primary communication terminal 12, and the service nodes 18A, 18B, and 18C may act as SIP proxies for the primary communication terminal 12, once the primary communication terminal 12 registers with any one of the service nodes 18.

Initially, the primary communication terminal 12 will periodically attempt to register with its default SIP proxy, which in this example is service node 18A. As such, the primary communication terminal 12 will send a Register message to service node 18A in an attempt to register (step 100). The Register message may identify service node 18A as the primary service node for the primary communication terminal 12. Upon receipt of the Register message, service node 18A will take the necessary steps to register the primary communication terminal 12 and provide an Acknowledgement message (ACK) back to the primary communication terminal 12 (step 102). At this point, service node 18A can act as a SIP proxy for the primary communication terminal 12, and thus assist in establishing, controlling, and ending communication sessions with any other communication terminal. The primary communication terminal 12 will periodically send additional Register messages to service node 18A (step 104), which will process the Register message and send an Acknowledgement message back to indicate the primary communication terminal 12 is registered.

At some point, a failure in the communication network 16 or service node 18A will result in the Register message not being received by service node 18A or the Register message not being properly acknowledged. The primary communication terminal 12 may set a timer for measuring a period of time during which an acknowledgement should be received in response to a Register message sent to service node 18A. If the timer associated with the Register message times out (step 106), the primary communication terminal 12 will immediately send a Register message to an alternate service node 18B (step 108). The Register message may indicate that the primary service node 18A has failed or is not responding. The service node 18B may accept or deny the registration based on capacity, compatibility, or the like. In this instance, assume that service node 18B is heavily loaded and has detected an overload condition sufficient to warrant denial of the Register message from the primary communication terminal 12 (step 110). Service node 18B will then send a message back to the primary communication terminal 12 rejecting the registration request (step 112).

The primary communication terminal 12 will then send another Register message to yet another alternate service node 18C (step 114). The Register message may again indicate that the primary service node 18A has failed or is not responding. Assuming that service node 18C has the capacity to support the primary communication terminal 12, and thus act as a SIP proxy for the primary communication terminal 12, service node 18C will register the primary communication terminal 12 and send an Acknowledgement in response to the Register message (step 116). At this point, the primary communication terminal 12 is registered with service node 18C and will begin sending periodic Register messages to service node 18C to maintain registration as well as to detect any failure in association with service node 18C (step not shown).

In this embodiment, service node 18C will alert other related service nodes 18A and 18B that the primary communication terminal 12 has re-registered with service node 18C. In particular, a re-registration notification may be sent by service node 18C to service nodes 18B and 18A (steps 118 and 120). While the primary communication terminal 12 is sending Register messages on a periodic basis to service node 18C, the primary communication terminal 12 may also send Register messages to service node 18A on a periodic basis to effectively check to see if service node 18A is back online or if the communication failure in the communication network 16 has been corrected. For example, the primary communication terminal 12 may send a first Register message to service node 18A (step 122), wherein the failure is still in place and the timer set in response to sending the Register message times out (step 124). After a period of time, another Register message is sent to service node 18A (step 126). Assume at this point that service node 18A receives the Register message, registers the primary communication terminal 12 in association with service node 18A, and sends an acknowledgement message back to the primary communication terminal 12 (step 128). Service node 18A will then send a Registration Notification to service nodes 18B and 18C (steps 130 and 132).

At this point, the primary communication terminal 12 has successfully re-registered with service node 18A, and service nodes 18B and 18C are alerted to this condition. Notably, service node 18C will recognize that it is no longer the SIP proxy for the primary communication terminal 12. Meanwhile, the primary communication terminal 12 will continue to send periodic Register messages to service node 18A (step 134) and await acknowledgement in response (step 136). When acknowledgement is not received in a timely fashion, re-registration attempts will be made with service node 18B, and if service node 18B is not available, with service node 18C. In another embodiment, the primary communication terminal 12 could try to register with service node 18C, since service node 18B was previously overloaded.

In the above embodiment, the primary communication terminal takes an active role in determining whether service node 18A is available, and when service node 18A is not available for some reason, the primary communication terminal 12 will take the initiative to register with an alternate service node 18B. Further, the alternate service nodes 18B and 18C may communicate with each other to indicate times when registrations or re-registrations occur. Alternatively, the primary communication terminal 12 could provide these notification messages.

Figure 3:
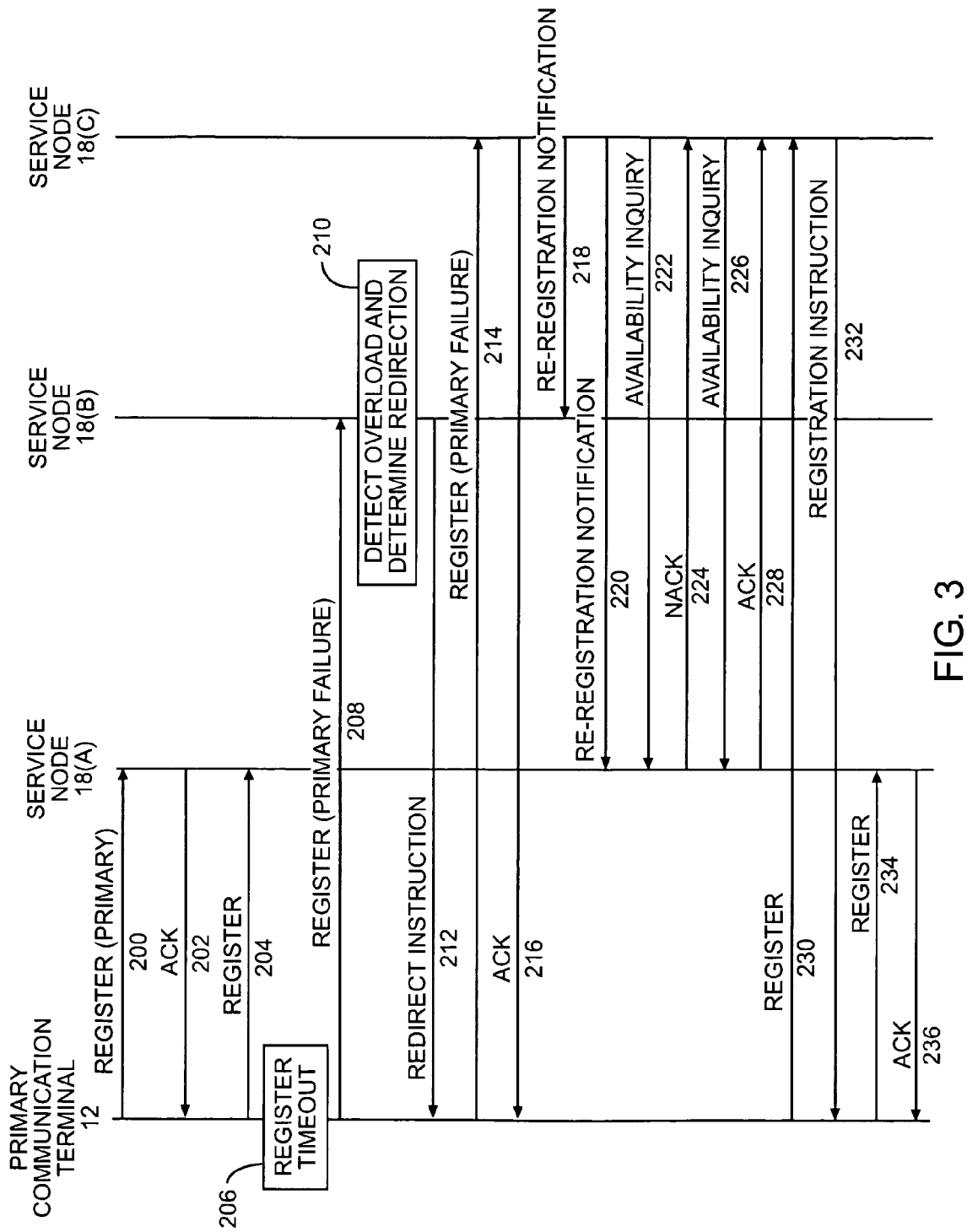
FIG. 3 is a communication flow diagram according to a second embodiment of the present invention.

In another embodiment, the primary communication terminal 12 is less sophisticated and operates in response to instructions from the service nodes 18, which are capable of communicating with each other with respect to registrations and re-registrations. The communication flow in FIG. 3 is illustrative of the operation of the primary communication terminal 12 with respect to the various service nodes 18. Initially, assume that the primary communication terminal 12 periodically sends Register messages to service node 18A, which acts as the primary SIP proxy for the primary communication terminal 12 (step 200). When service node 18A properly receives the Register message and registers the primary communication terminal 12, an Acknowledgement message is sent back to the primary communication terminal 12 (step 202). If a Register message is sent to service node 18A (step 204) and an acknowledgement is not received before the Register Timer times out (step 206), the primary communication terminal 12 will automatically send a Register message to an alternate service node 18, in this case service node 18B (step 208). The Register message may indicate that the primary service node 18A has failed or is otherwise non-responsive given a failure of a service node 18 or a failure within the communication network 16.

Again assume that service node 18B detects an overload condition (step 210) and determines that it cannot support the primary communication terminal 12. In contrast to the above embodiment, service node 18B will not simply reject registration, but will determine a service node 18 with which the primary communication terminal 12 should attempt to register. The service node 18 may have a prioritized list of service nodes 18 or may communicate with other service nodes 18 to determine the service node 18 with which the primary communication terminal 12 should register. Assume that the service node 18B determines that the primary communication terminal 12 should attempt to register with service node 18C, and as such will send a Redirect Instruction to the primary communication terminal 12 indicating the same (step 212). In response to the Redirect Instruction from service node 18B, the primary communication terminal 12 will send a Register message to service node 18C (step 214). Again, the Register message may indicate that the primary service node 18A is associated with a failure. Service node 18C will register the primary communication terminal 12 and send an acknowledgement back to the primary communication terminal 12 (step 216). Service node 18C will send re-registration notification messages to service nodes 18B and 18A (steps 218 and 220).

Meanwhile, the primary communication terminal 12 may continue to periodically send Register messages to service node 18C (step not shown). Further, service node 18C will periodically send availability inquiries to service node 18A to determine whether service node 18A is available for registration in association with the primary communication terminal 12 (step 222). Assuming service node 18A is still unavailable for supporting the primary communication terminal 12, a Negative Acknowledgement (NACK) may be sent back to service node 18C (step 224). At some point, service node 18A will become available, and when service node 18C sends an availability inquiry to service node 18A (step 226), service node 18A will respond with an acknowledgement (step 228) indicating that service node 18A is available for registering the primary communication terminal 12. At this point, service node 18C recognizes that the primary communication terminal 12 can return to service node 18A. The primary communication terminal 12 may send a Register message to service node 18C (step 230), which may respond by sending a Registration Instruction to the primary communication terminal 12 (step 232). The Registration Instruction will instruct the primary communication terminal 12 to attempt to register with service node 18A. Accordingly, the primary communication terminal 12 will send a Register message to service node 18A (step 234), which will register the primary communication terminal 12 and send an acknowledgement in response to the Register message (step 236).

Figure 4:
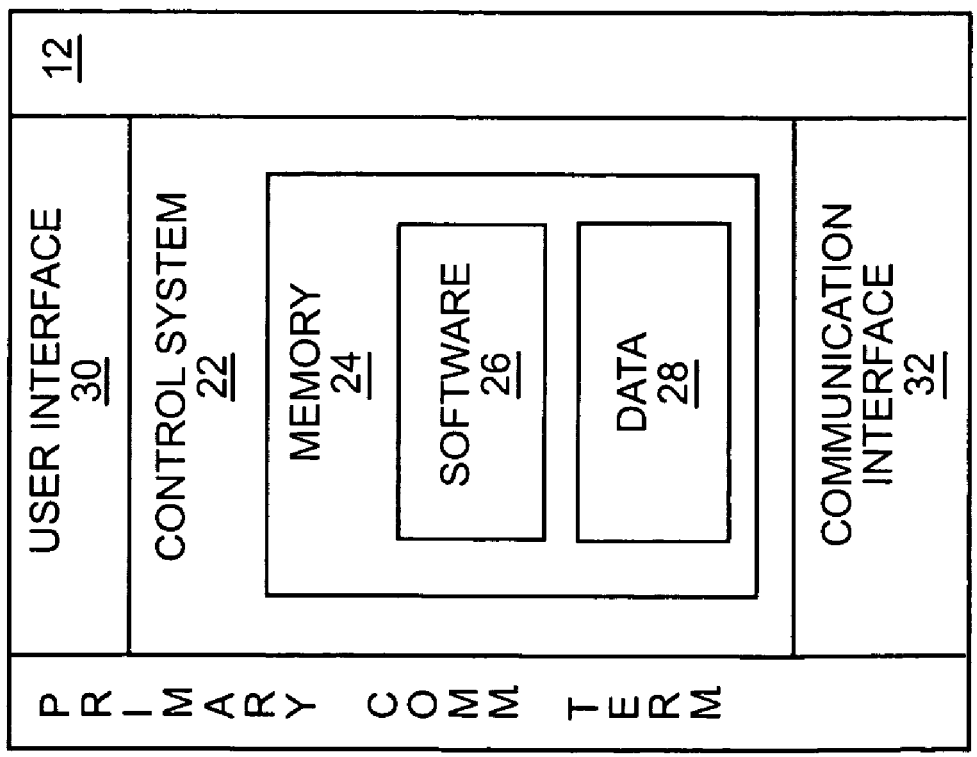
FIG. 4 is a block representation of a primary communication terminal according to one embodiment of the present invention.

Turning now to FIG. 4, a block representation of a primary communication terminal 12 is illustrated. As noted, the primary communication terminal 12 may take various forms and support wired or wireless communications. As illustrated, a control system 22 is associated with memory 24 having sufficient software 26 and data 28 to operate as described above. The control system 22 may be associated with a user interface 30 as well as a communication interface 32, which supports communications with the communication network, directly or indirectly via any number of access networks.

Figure 5:
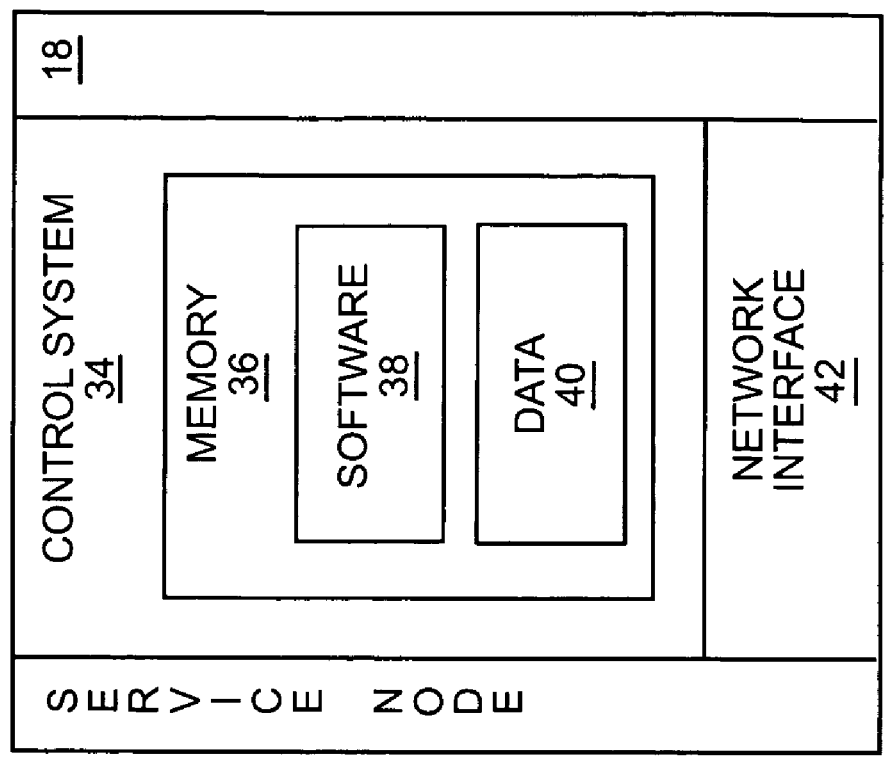
FIG. 5 is a block representation of a service node according to one embodiment of the present invention.

With reference to FIG. 5, a service node 18 is illustrated. The service node 18 may include a control system 34 having sufficient memory 36 for the requisite software 38 and data 40 to facilitate operation as described above. The control system 34 will include a network interface 42 for facilitating communications with the communication network 16.

With the present invention, transient network outages or failures of the service nodes 18 are handled without requiring traditional localized redundancy. Active service nodes 18 that support other communication terminals may handle their communication terminals on a temporary basis during failures, which may include outages or overloads. Further, the service nodes 18 can operate to ensure that the failures do not result in overloading those service nodes 18 that remain active. The system responds to outages or failures in an automatic fashion and will recover when these outages or failures are corrected. By allowing the active service nodes 18 to serve as backup service nodes 18 to certain communication terminals, as well as avoiding overload conditions by further redirecting registration attempts, a more optimal failure response is provided.

Those skilled in the art will recognize improvements and modifications to the preferred embodiments of the present invention. All such improvements and modifications are considered within the scope of the concepts disclosed herein and the claims that follow.

What is claimed is:

1. A communication terminal comprising:
a user interface;
a communication interface; and
a control system associated with the user interface and the communication interface, the control system adapted to:
periodically attempt to communicate with a first service node, wherein first configuration data identifies the first service node as a default primary service node for the communication terminal and wherein the primary service node is adapted to facilitate communication sessions involving the communication terminal;
detect if an attempt to communicate with the first service node fails; and
when an attempt to communicate with the first service node fails, attempt to associate with a second service node serving as a default primary service node for a first group of communication terminals other than the communication terminal and wherein the second service node is adapted to facilitate communication sessions involving the communication terminal and the first group of communication terminals;
receive from the second service node a redirection message based on an overload condition of the second service node instructing the communication terminal to attempt to associate with a third service node, wherein the redirection message identifies the third service node;
upon receiving the redirection message, successfully associate with the third service node serving as a primary service node for a second group of communication terminals and adapted to facilitate communication sessions involving the communication terminal and the second group of communication terminals;
while associated with the third service node, receive a registration instruction from the third service node, the registration instruction instructing the communication terminal to attempt to associate with the first service node; and
in response to the registration instruction, successfully associate with the first service node in lieu of the third service node.

2. The communication terminal of claim 1 wherein the first service node and the second service node are located apart from one another.

3. The communication terminal of claim 1 wherein the first service node supports first communication terminals generally affiliated with a first geographic region and the second service node supports second communication terminals generally affiliated with a second geographic region separate from the first geographic region.

4. The communication terminal of claim 1 wherein the second service node is not a redundant service node associated with the first service node.

5. The communication terminal of claim 1 wherein the first service node and the second service node are adapted to act as proxies to facilitate communication sessions when associated with the communication terminal.

6. A method comprising:
periodically attempting to communicate with a first service node identified by first configuration data as a default primary service node for a communication terminal and adapted to facilitate communication sessions involving the communication terminal;
detecting if an attempt to communicate with the first service node fails;
when an attempt to communicate with the first service node fails, attempting to associate with a second service node serving as a default primary service node for a first group of communication terminals other than the communication terminal and adapted to facilitate communication sessions involving the communication terminal and the first group of communication terminals;
receiving from the second service node a redirection message based on an overload condition of the second service node instructing the communication terminal to attempt to associate with a third service node, wherein the redirection message identifies the third service node;
upon receiving the redirection message, successfully associating with the third service node serving as a primary service node for a second group of communication terminals and adapted to facilitate communication sessions involving the communication terminal and the second group of communication terminals;
while associated with the third service node, receiving a registration instruction from the third service node, the registration instruction instructing the communication terminal to attempt to associate with the first service node; and
in response to the registration instruction, successfully associating with the first service node in lieu of the third service node.

7. The method of claim 6 wherein the first service node and the second service node are located apart from one another.

8. The method of claim 6 wherein the first service node supports first communication terminals generally affiliated with a first geographic region and the second service node supports second communication terminals generally affiliated with a second geographic region separate from the first geographic region.

9. The method of claim 6 wherein the second service node is not a redundant service node associated with the first service node.

10. The method of claim 6 wherein periodically attempting to communicate with the first service node further comprises sending a register message to the first service node, and detecting if the attempt to communicate with the first service node fails further comprises determining when an acknowledgement to the register message is not properly received.

11. The method of claim 6 wherein the first service node and the second service node are adapted to act as proxies to facilitate communication sessions when associated with the communication terminal.

* * * * *